United States Patent [19]
Reiff et al.

[11] Patent Number: 5,278,993
[45] Date of Patent: Jan. 11, 1994

[54] INTEGRAL SPRING LOADED HINGE AND SWITCH FOR PORTABLE RADIO DEVICE

[75] Inventors: David E. Reiff; Mac W. Branan, both of Ft. Lauderdale; Dale W. Dorinski, Caral Springs; Jill C. Olkoski, Ft. Lauderdale; Danielle P. Dzung, Sunrise; Stephen M. Stanton, Lauderhill; Rudy Yorio, Boca Raton, all of Fla.

[73] Assignee: Motorola, Inc., Schaumburg, Ill.

[21] Appl. No.: 653,199

[22] Filed: Feb. 1, 1991

[51] Int. Cl.⁵ .................. H01R 39/02; H04B 1/00
[52] U.S. Cl. ...................... 455/90; 455/351; 379/433; 439/29; 439/65
[58] Field of Search .............. 455/89, 90, 344, 348, 455/351, 128; 379/428, 429, 433; 200/323; 439/164, 165, 13, 31, 29, 65

[56] References Cited

U.S. PATENT DOCUMENTS

| 4,471,493 | 9/1984 | Schober | 455/90 |
| 4,897,873 | 1/1990 | Beutler et al. | 379/433 |

Primary Examiner—Reinhard J. Eisenzopf
Assistant Examiner—Chi Pham
Attorney, Agent, or Firm—Dale W. Dorinski

[57] ABSTRACT

An integral electric switch, for controlling an electronic apparatus, comprises a main housing and a flap portion, rotatably attached thereto. The main housing contains the electronic apparatus. The flap portion has a hinge cam for rotatably attaching the flap portion to the main housing, so that the flap portion is movable from a defined open position to a closed position with respect to the main body. The main housing comprises a plurality of spring fingers making sliding contact with the hinge cam as the flap portion is rotated from the open position to the closed position thus providing a switching function and electrical connection from the housing to devices contained within the flap.

18 Claims, 4 Drawing Sheets

INTEGRAL SPRING LOADED HINGE AND SWITCH FOR PORTABLE RADIO DEVICE

TECHNICAL FIELD

This invention relates generally to the field of electrical switches, and more specifically to electrical switches that may be used in portable communication devices.

BACKGROUND

Conventional designs of housings having closable flaps usually employ a hinge with separate spring loading mechanisms to provide a self closing feature. Switching and control functions are provided by additionally separate components usually purchased from a switch and control manufacturer and require additional parts for actuation. In addition, any required electrical connections between the two halves of the hinged portions would require separate wires or flexible circuit connections that must be somehow routed around the spring and hinge mechanisms.

SUMMARY OF THE INVENTION

Briefly, according to the invention, an electric switch, for controlling an electronic apparatus, comprises a main housing and a flap portion, rotatably attached thereto. The main housing contains the electronic apparatus. The flap portion has a hinge cam for rotatably attaching the flap portion to the main housing, so that the flap portion is movable from an open position to a closed position with respect to the main body. The main housing comprises a plurality of spring fingers making sliding contact with the hinge cam as the flap portion is rotated from the open position to the closed position, and from the closed position to the open position. The main housing may have metalized surface portions on the hinge cam. The spring fingers may also be metalized so that electrical conductive contact may be made with the metalized portions of the housing. The result is that the switching control functions and any required electrical interconnections are accomplished without the use of any additional components separate from the housing or the rotatable flap.

DETAILED DESCRIPTION OF THE PREFERRED EMBODIMENT

Figure 1A:
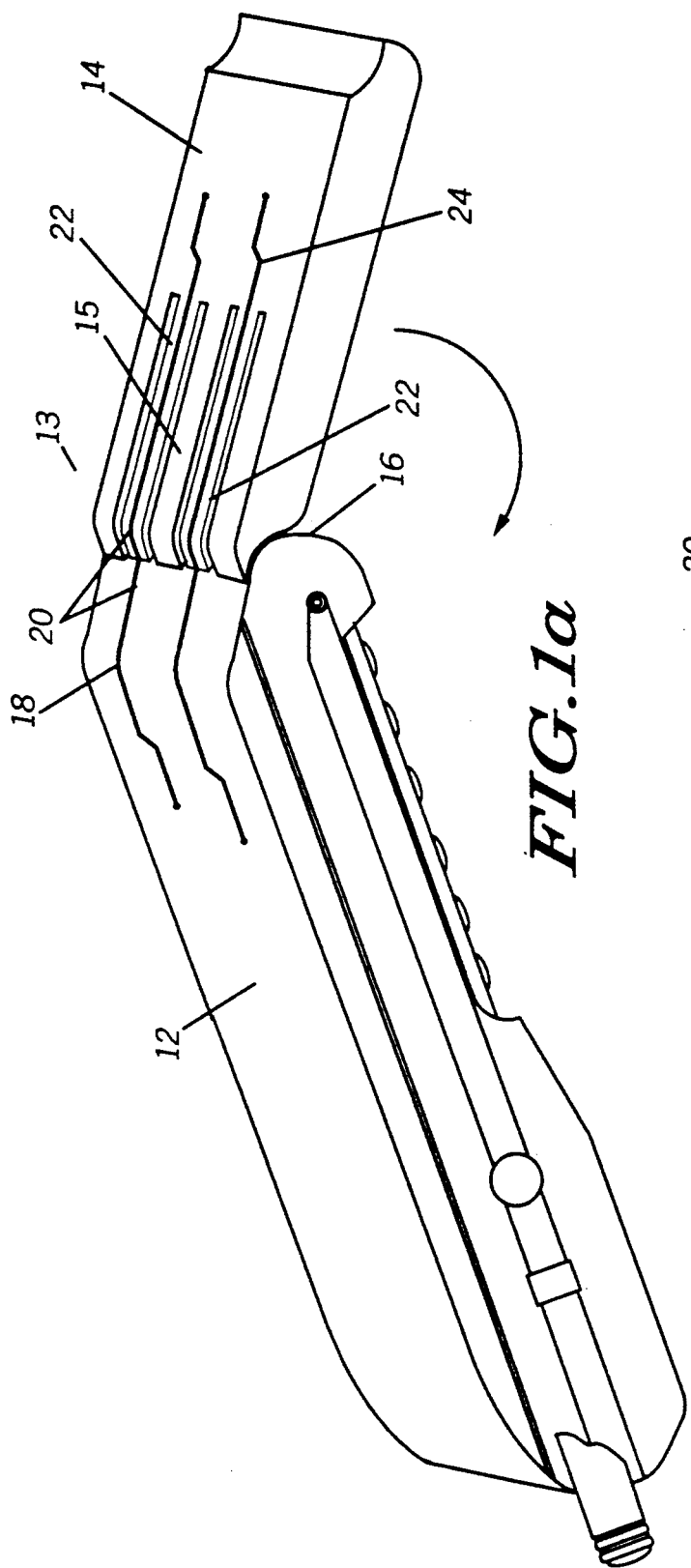
FIG. 1A shows a hand-held communication device (e.g., a radio) with a hinge/switch in accordance with the invention.

Referring to FIG. 1A, a hand-held communication device 10 (e.g., a radio) comprising a hinge/switch 13 in accordance with the invention is shown. The communication device 10 comprises a main housing 12 containing the electronic apparatus of the communication device 10. A flap portion 14 is rotatably attached to the main housing by means of a hinge 13. In FIG. 1, the communication device is in an open position, however, the flap 14 may be rotated into a closed position. The main housing comprises some metalized surface portions 18 that are coupled to the electronic apparatus of the communication device 10. Similarly, the flap 14 also includes metalized surface portions 24 (which may also be coupled to circuitry within the flap 14).

The hinge 13 is formed in two halves, each of which is integral to the two pieces (i.e., not a separate part). Typically, the material used for the device would be an injection molded plastic, but the invention is not limited to this type of material, and can be made from anything that would be considered a non-conductor, even a conducting material coated with a nonconductor. Proper selection of materials provides a self-lubricated, electrically conducting hinge for use in hostile environments.

The flap 14 also comprises a plurality of cantilevered beams 15 and 22 which are formed in the flap 14. The largest of the beams (15) is used to form an integral spring finger (or cam follower), which provides tension against a curved surface 16 (or cam portion) 16 in the main housing 12. The curved surface 16 is formed with a flat area to provide the cam action, which causes the flap 14 to come to rest at a preferred position (such as an open or closed position).

Figure 1B:
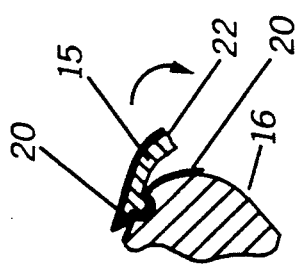
FIG. 1B shows a detent feature for use in the hinge/switch of FIG. 1.

Referring to FIG. 1B, a detent in the form of a projection on the spring finger 15 or 22 and a recess in the cam area 16 can be additionally provided, if desired, to provide additional force to maintain the position of the flap 14 for providing the desired electrical interconnections. Additional spring fingers 22 are much smaller than the spring 15, and serve only to provide enough pressure to maintain electrical contact.

The metalized portions 18 may be placed on the surface of the main housing 12 of the communication device 10 to form circuits for the electronic apparatus of the communication device 10. The circuitry 18 is wrapped around the curved surface 16 of the hinge 13 to correspond to the area where the spring fingers 22 contact. The spring fingers 22 may also be selectively metallized (20), such that the circuit is continued across the hinge area and onto the flap 14. Modification of the circuit geometry on the curved area of the hinge allows one to configure other options in the assembly. For example, the metallization 20 on the curved surface is only extended for a fraction of the distance around the radius, instead of completely. In this configuration, the circuit is not continuous when the movable half is rotated to the "closed" position, and an integral on/off switch is formed. By changing the circuitry 20 on the curved portion from metal to a resistive element, a variable resistor can be formed that now can be used as a position-sensitive device that will indicate the location of the movable flap 14 relative to the fixed housing 12.

Figure 2:
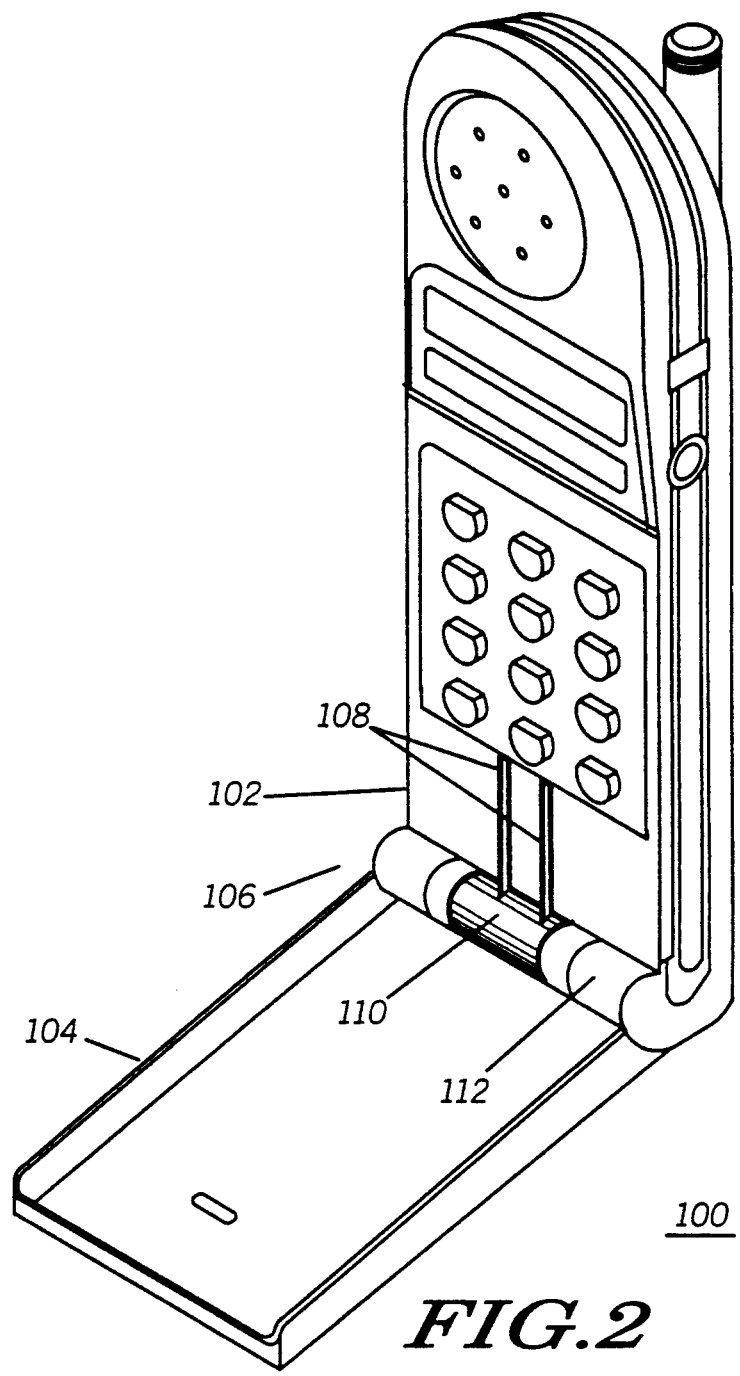
FIG. 2 shows another embodiment of the invention.

FIG. 2 shows another embodiment of the invention. A hand-held communication device 100 comprises a fixed housing 102 and a movable flap 104, rotatably attached thereto by means of a hinge 106. The hinge 106 has a cam portion 112 which includes metalized portions 110. The housing 102 comprises a set of metallic fingers 108 or selectively coated (or plated) plastics (which are integral extensions of the housing 102). As the cam 112 rotates, the plated portions 110 come into contact with the spring fingers 108 thus sending information back to the circuitry of the main housing 102 on the relative position of the flap 104.

Figure 3:
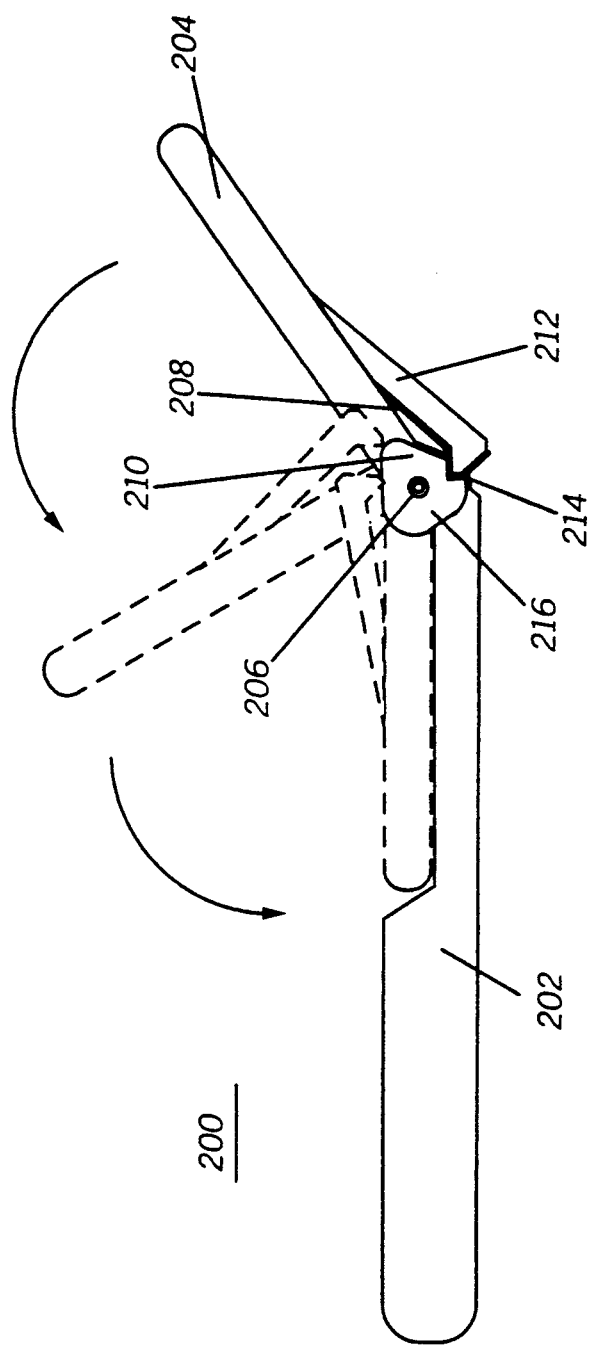
FIG. 3 shows a further embodiment of the invention.

Referring to FIG. 3, a hand-held communication device 200 includes a housing 202 and a movable flap 204, rotatably attached thereto by means of a hinge 206. In this embodiment, the contact finger 212 rides along the circular end 210 of the cam 216. The finger 212 includes a contact member 208 for making contact with selectively plated strips 214 on the circular portion 210.

Figure 4:
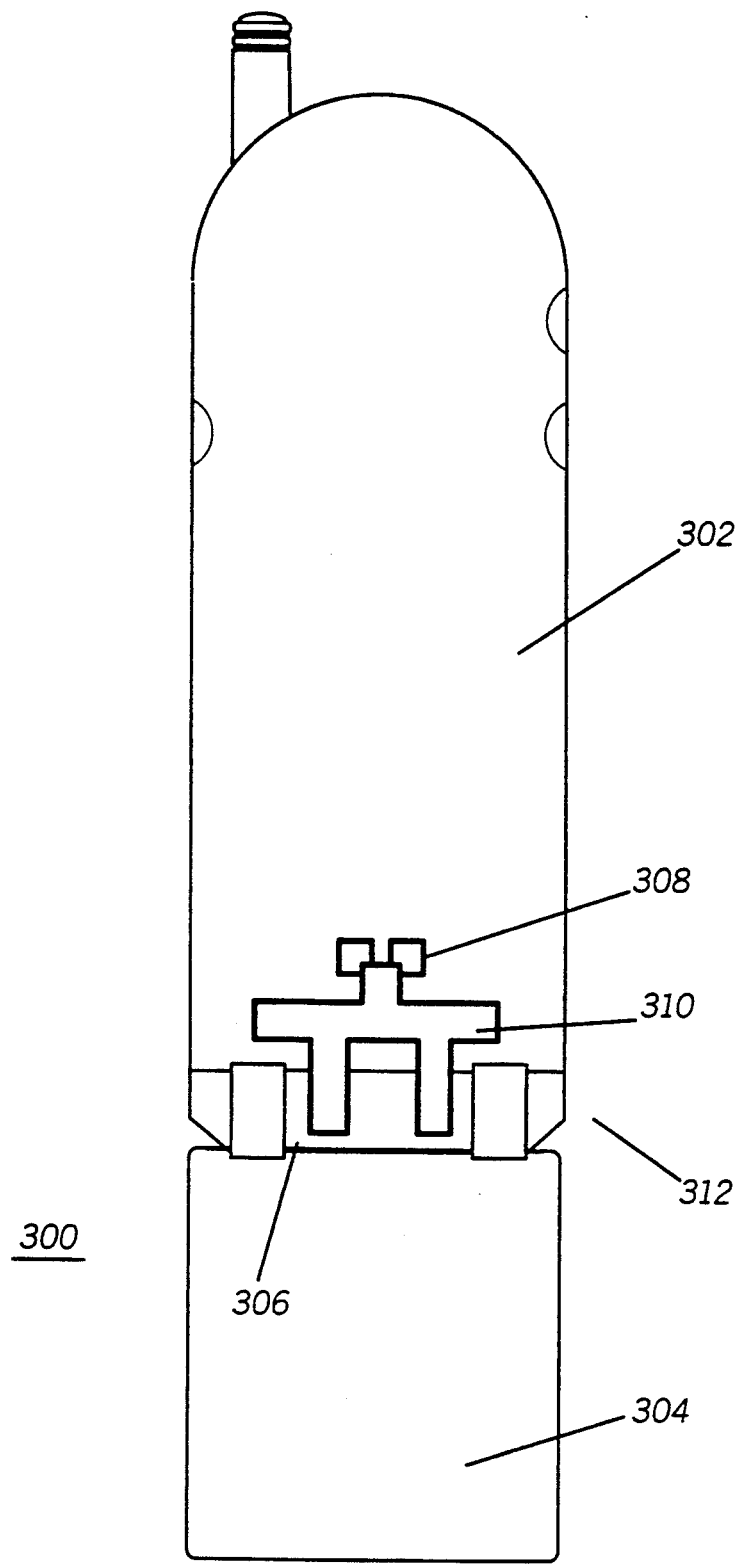
FIG. 4 shows yet another embodiment of the invention.

Referring to FIG. 4, a slightly different embodiment of the invention in a hand-held communication device 300 is shown. A communication device 300 includes a housing 302 attached to a flap 304 by means of a hinge 312. The housing 302 has a spring/switch contact finger 310 mounted thereon. The spring finger 310 pivots about a fulcrum mounted at the center of the spring finger 310. The spring/switch contact finger 310 may be metal or a selectively plated part of the housing 302. The flap 304 includes a cam 306. In this embodiment, the cam 306 does not act as a conductive element. The contact finger 310 is wider than the contact finger 212 (shown in FIG. 3), and rides along the cylindrical surface of the cam 306. As the flap 304 rotates from the open position (as shown in FIG. 4) to the closed position, the cam 306 forces one end of the spring finger 310 upwards and the other end (which is metalized) makes contact with a plated runners 308 on the main housing 302. The metallic portion of the spring finger 310 creates a short across the runners 308, thus supplying the required rotational feedback to the communication device 300. The spring finger 310 also acts as a spring forcing the flap 304 to remain open or closed, however the cam profile dictates.

Thus, the invention eliminates the need for parts required to provide spring action and parts required to make electrical connections by including electrical circuits as parts of the spring mechanism.

What is claimed is:

1. An electric switch, for controlling an electronic apparatus, comprising:

a housing for containing the electronic apparatus;

a flap, having a metallized surface portion, and having a hinge for rotatably attaching the flap to the housing, so that the flap is movable from an open position to a closed position with respect to the housing; and a cantilever spring formed as an integral part of the housing so that the housing and the cantilever spring are a single part, the cantilever spring having a metallized surface portion thereon for making electrically conductive contact with at least part of the metallized surface portion of the flap as the flap is rotated from the open position to the closed position, and from the closed position to the open position.

2. The electric switch of claim 1, wherein the hinge comprises a cam-shaped portion, and the cantilever spring provides tension against the cam-shaped portion.

3. The electric switch of claim 2, wherein the cam-shaped portion comprises a metallized surface portion for making electrically conductive contact with at least part of the metallized surface portion of the cantilever spring as the flap is rotated from the open position to the closed position, and from the closed position to the open position.

4. The electric switch of claim 1, wherein the metallized surface portion of the housing further comprises circuits for the electronic apparatus.

5. The electric switch of claim 4, wherein the switch operates to turn on the electronic apparatus when the electric switch is not in the closed position, and to turn off the electronic apparatus when the electric switch is in the closed position.

6. The electric switch of claim 1 wherein the electronic apparatus comprises a radio.

7. The electric switch of claim 4, wherein the electric switch indicates the relative position of the flap with respect to the housing, to the electronic apparatus.

8. The electric switch of claim 7, wherein the metallized portion of the flap comprises an electrically resistive part for determining the position of the flap with respect to the housing.

9. An electric switch, for controlling an electronic apparatus, comprising:

a housing for containing the electronic apparatus;

a flap, having a metallized surface portion, and having a hinge for rotatably attaching the flap portion to the housing, so that the flap is movable from an open position to a closed position with respect to the housing, the hinge comprising a cam-shaped portion having a recess; and the housing comprising at least one integral spring finger, the spring finger formed as a unitary portion of the housing and having a metallized surface portion for making electrically conductive contact with at least part of the metallized surface portion of the flap as the flap is rotated from the open position to the closed position, and from the closed position to the open position, the spring finger providing tension against the cam-shaped portion, and the spring finger including a projection for fitting in the recess to provide a detent for the electric switch.

10. An electric switch, for controlling an electronic apparatus, comprising:

a housing for containing the electronic apparatus;

a flap, having a metallized surface portion;

a hinge for rotatably attaching the flap to the housing, so that the flap is movable from an open position to a closed position with respect to the housing; and a cantilever spring formed as an integral part of the flap so that the flap and the cantilever spring are a single part, the cantilever spring having a metallized surface portion thereon for making electrically conductive contact with at least part of a metallized surface portion of the housing as the flap is rotated from the open position to the closed position, and from the closed position to the open position.

11. The electric switch of claim 10, wherein the hinge comprises a cam-shaped portion, and the cantilever spring provides tension against the cam-shaped portion.

12. The electric switch of claim 11, wherein the cam-shaped portion comprises a metallized surface portion for making electrically conductive contact with at least part of the metallized surface portion of the cantilever spring as the flap is rotated from the open position to the closed position, and from the closed position to the open position.

13. The electric switch of claim 10, wherein the metalized surface portions of the housing further comprise circuits for the electronic apparatus.

14. The electric switch of claim 13, wherein the switch operates to turn on the electronic apparatus when the electric switch is not in the closed position, and to turn off the electronic apparatus when the electric switch is in the closed position.

15. The electric switch of claim 10 wherein the electronic apparatus comprises a radio.

16. The electric switch of claim 13, wherein the electric switch indicates the relative position of the flap with respect to the housing, to the electronic apparatus.

17. The electric switch of claim 16, wherein the metallized portion of the housing comprises an electrically resistive part for determining the position of the flap with respect to the housing.

18. An electric switch, for controlling an electronic apparatus, comprising:
 a housing for containing the electronic apparatus;
 a flap, having a metallized surface portion;
 a hinge for rotatably attaching the flap to the housing, so that the flap is movable from an open position to a closed position with respect to the housing, the hinge comprising a cam shaped portion having a recess; and
 the flap comprising at least one integral spring finger, the spring finger formed as a unitary portion of the flap and having a metallized surface portion for making electrically conductive contact with at least part of a metallized surface portion of the housing as the flap is rotated from the open position to the closed position, and from the closed position to the open position, the spring finger providing tension against the cam-shaped portion, and the spring finger including a projection for fitting in the recess to provide a detent for the electric switch.

* * * * *